P. HUERNE.
Self-Cleaning Water-Tanks.

No. 147,841. Patented Feb. 24, 1874.

Witnesses,
John L. Borne
C. Milton Richardson

Inventor,
Prosper Huerne
by Dewey & E
Attys

UNITED STATES PATENT OFFICE.

PROSPER HUERNE, OF SAN FRANCISCO, CALIFORNIA.

IMPROVEMENT IN SELF-CLEANING WATER-TANKS.

Specification forming part of Letters Patent No. 147,841, dated February 24, 1874; application filed January 5, 1874.

*To all whom it may concern:*

Be it known that I, PROSPER HUERNE, of San Francisco city and county, State of California, have invented a Settling and Self-Cleaning Water-Tank; and I do hereby declare the following description and accompanying drawings are sufficient to enable any person skilled in the art or science to which it most nearly appertains to make and use my said invention without further invention or experiment.

It is a well-known fact that the water which is supplied to cities contains more or less impurities, which, although not positively injurious in every instance, is not agreeable to the consumer. Some cities are supplied with water from turbid rivers or lakes, which contains a large amount of infusorial and extraneous matter, and in this instance the water, if not properly freed of its foreign matter before being used, cannot be used satisfactorily for even ordinary domestic purposes.

The object of my invention is to provide a water-tank in which water can be settled and drawn off for domestic and other uses without disturbing the sediment which has been deposited, and which can be easily cleansed after each tankful of settled water has been drawn off.

Figure 1:
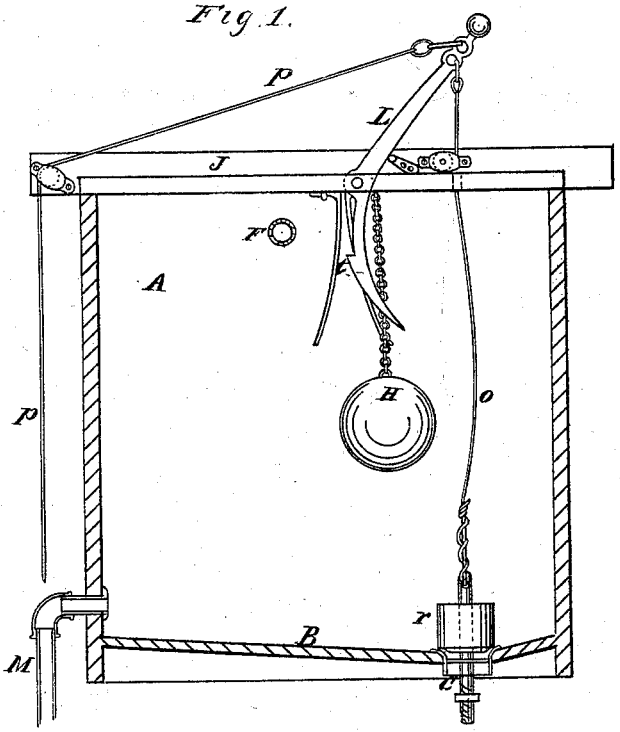
Figure 2:
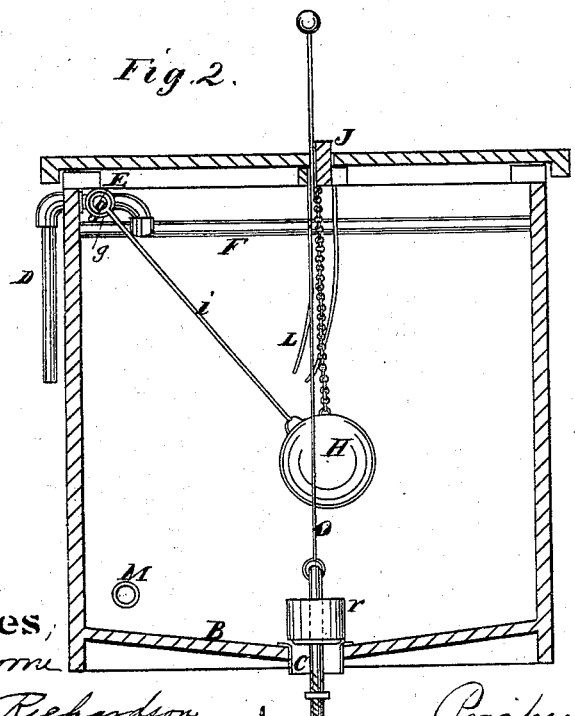

In the drawing, Figure 1 is a sectional elevation, showing the transverse timber J and the latch-lever. Fig. 2 is a section taken transversely across the beam J.

A is a tank of any desired capacity, which can be placed upon the roof of a building or other convenient locality. This tank I provide with an inclined bottom, B. I prefer to construct this bottom with an outlet, C, and slope the bottom from each side toward the outlet, as shown. D is the water-pipe which connects with the water-main, and through which the tank is filled. A faucet, E, on the interior of the tank, connects at one end, through the side of the tank, with the pipe D, while its opposite end connects with a perforated pipe, F, which extends entirely across the upper part of the tank, so that the water enters the tank in the form of a shower or spray. The faucet E is provided with a cylindrical valve, $g$, which is operated by a float, H, and connecting-rod $i$, in the usual way, so that the float will automatically regulate the supply of water. J is a timber which I secure upon the tank transversely to the perforated pipe F, and at a short distance from the faucet. Opposite the valve $g$ of the faucet E I suspend an upright lever, L, by its middle, to the transverse timber J, so that one end will extend below the timber into the tank, while the opposite end extends above it. The lower end of this lever is slightly bent or otherwise provided with a curved surface, so that as the ball or float H is raised by the water the rod $i$ will be forced upward against the curved surface of the lower end of the lever until the valve $g$ closes off the water, thus forming a friction-latch for holding the float at its highest position, and keeping the valve closed until it is required to be opened for cleaning the tank. The water thus run in the tank is allowed to remain until all of the sediment settles to the bottom. M is a pipe which leads from the tank down into the house, and through which the settled water can be drawn. This pipe is connected with the tank at a short distance above the bottom, so that it will only draw the water off to a certain level without disturbing the sediment or settling. The plug $r$, which closes the sediment-outlet $c$ in the bottom of the tank, is connected with the projecting upper end of the lever L by a wire or cord, $o$, while another wire or cord, $p$, leads from the upper end of this lever down into the house or yard within easy reach of a person standing upon the ground, or it may only lead to the first floor below.

By pulling the wire $p$ after the settled water has been drawn from the tank, the float H, which has remained in its highest position by the friction or pressure against the lower arm of the lever L, will be released, and the plug $r$ raised, so that the sediment-outlet and valve $g$ are opened simultaneously. The spray or shower of water which follows the opening of the valve $g$ will loosen and wash out, through the outlet-pipe, the sediment which has collected upon the bottom, after which, by releasing the wire $p$, the plug $r$ will close the outlet C, and allow the water to again fill the tank and raise the float and shut off the supply.

In the present instance I have represented a notch, t, on the lower end of the lever L, upon which the rod i, which carries the float H, will catch; but the friction will generally be sufficient to hold the float in its highest position.

By employing this settling-tank, water which cannot otherwise be used can be sufficiently purified to serve for all ordinary domestic purposes, and by attaching a filter to the pipe M it can be rendered perfectly pure for drinking purposes.

By employing two of these tanks upon a building, one can be filled and settling while the other one is being used, thus giving a continuous supply of fresh, clean water.

Having thus described my invention, what I claim, and desire to secure by Letters Patent, is—

1. The tank A, with its inclined bottom B and outlet C, and having the faucet E, with its cylindrical valve g, connecting-rod i, and float H, in combination with the timber J, with its upright centrally-pivoted lever L, wire o, plug r, and operating-wire p, all combined and arranged substantially as and for the purpose above described.

2. In combination with a self-cleaning tank, the perforated shower-pipe F, substantially as and for the purpose above described.

3. The tank A, in combination with the latch-lever L, so arranged as to support the float H at its highest position, and to release the float and draw the plug r simultaneously, as set forth.

In witness whereof I hereunto set my hand and seal.

PROSPER HUERNE. [L. S.]

Witnesses:
JOHN L. BOONE,
C. MILTON RICHARDSON.